Figure 1:
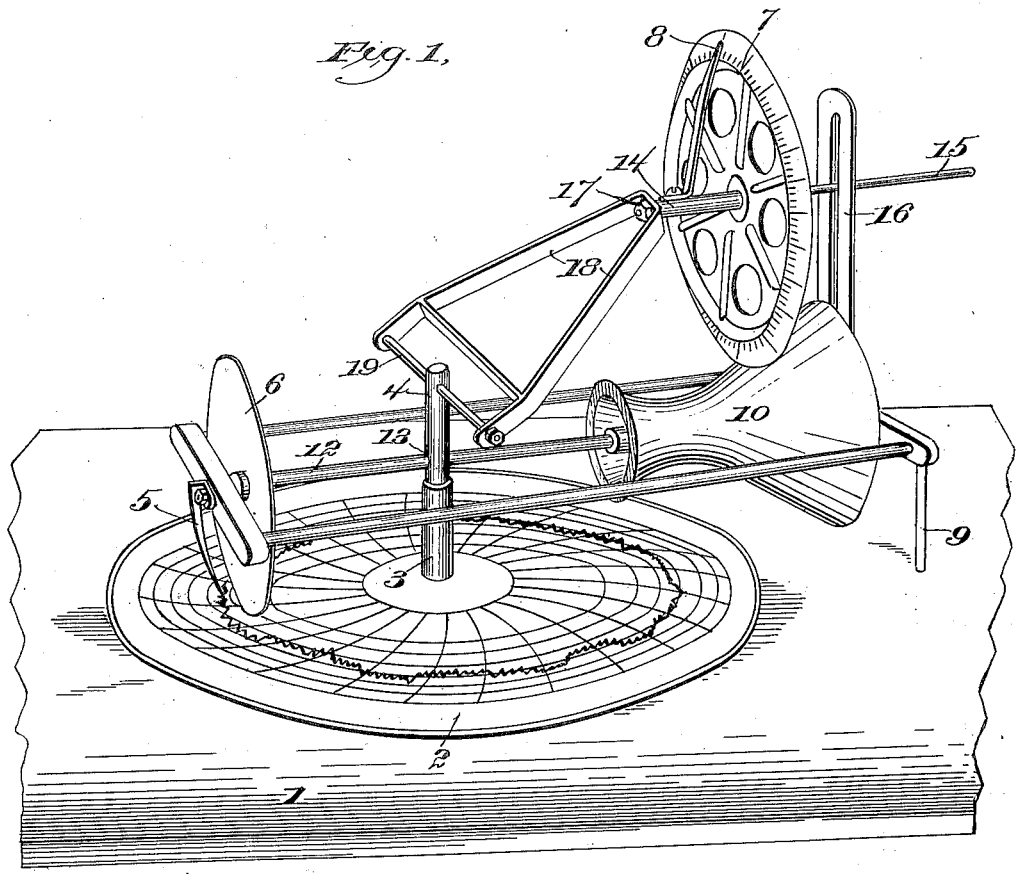

E. G. BAILEY.
FUNCTIONAL INTEGRATING DEVICE.
APPLICATION FILED JAN. 22, 1913.

1,087,915.

Patented Feb. 24, 1914.

E. G. BAILEY.
FUNCTIONAL INTEGRATING DEVICE.
APPLICATION FILED JAN. 22, 1913.

1,087,915.

Patented Feb. 24, 1914.

UNITED STATES PATENT OFFICE.

ERVIN G. BAILEY, OF NEWTON HIGHLANDS, MASSACHUSETTS.

FUNCTIONAL INTEGRATING DEVICE.

1,087,915.    Specification of Letters Patent.    Patented Feb. 24, 1914.

Application filed January 22, 1913.  Serial No. 743,478.

*To all whom it may concern:*

Be it known that I, ERVIN G. BAILEY, a citizen of the United States, residing in Newton Highlands, in the county of Middlesex and State of Massachusetts, have invented an Improvement in Functional Integrating Devices, of which the following description, in connection with the accompanying drawings, is a specification, like letters on the drawings representing like parts.

The present invention relates to an integrating device by means of which the average or total of any quantity can be mechanically determined from a chart or record of a recording instrument, which quantity is some function of the motion of the pen of the recorder. For instance, in the case of a recording differential pressure gage which records the velocity head of a Pitot tube, Venturi tube, or orifice, the pressure difference is recorded, and the average pressure difference can be determined by means of a planimeter or radii averaging instrument, but as the rate of flow varies substantially as the square root of the pressure difference at any instant, it is impossible to ascertain the average rate of flow from the average pressure difference even though the chart may be graduated with unevenly spaced graduations which read in quantity direct. Other instances are found in the case of rectangular, V-notch, or other usual forms of weirs when the head or level of the liquid above the crest of the weir is recorded, and the average head is valueless as an indication of the average quantity, since the quantity varies as the three-halves, five-halves, or some other power of the head. Still another case is that of recording thermometers that depend upon pressure of some vapor such as sulfur-dioxid, alcohol, etc., to produce a motion of the recorder pen, and the temperature is some other than a direct ratio function of the pressure so that the average temperature cannot be determined from these charts with any known type of averaging instrument. Many recording electrical meters have non-uniform graduations and the quantity desired therefore cannot be averaged in the usual manner, since it is not directly proportional to the quantity recorded.

In order to determine the average of the quantity desired, from the record of a pen, the movement of which is caused by some function of said quantity which is not directly proportional thereto, the instrument embodying the invention is provided with a tracer, so arranged as to accommodate relative movements of the chart and tracer, one movement corresponding to the movement of the time element or original movement of the chart, and the other movement corresponding to the pen record.

The elements thus far described are substantially the same as the elements of the radii averaging instrument shown and described in United States Patent No. 927,338, granted to W. F. Durand; and the present invention consists in the combination with these elements of an integrating device whereby a result proportional to the average of some function of the radii is indicated by the instrument.

To illustrate the invention, I have shown an integrating device which consists of two coöperating elements, one of which is substantially stationary with relation to the chart, and the other movable with the tracer. If, therefore, one of the elements is a rotatable drum having a varying diameter along its axis, and the other a wheel in peripheral contact with said drum, the movement of either of these elements in line with the axis of both will vary the resultant rate of rotation of one or the other as the diameter of the drum varies at the point of contact during the movement.

The auxiliary movable element of the integrating device is caused to be rotated by that relative movement of the chart and tracer which corresponds to the time element, and the result desired, from the record which has been traced on the chart during any period of time, will be indicated.

Figure 2:
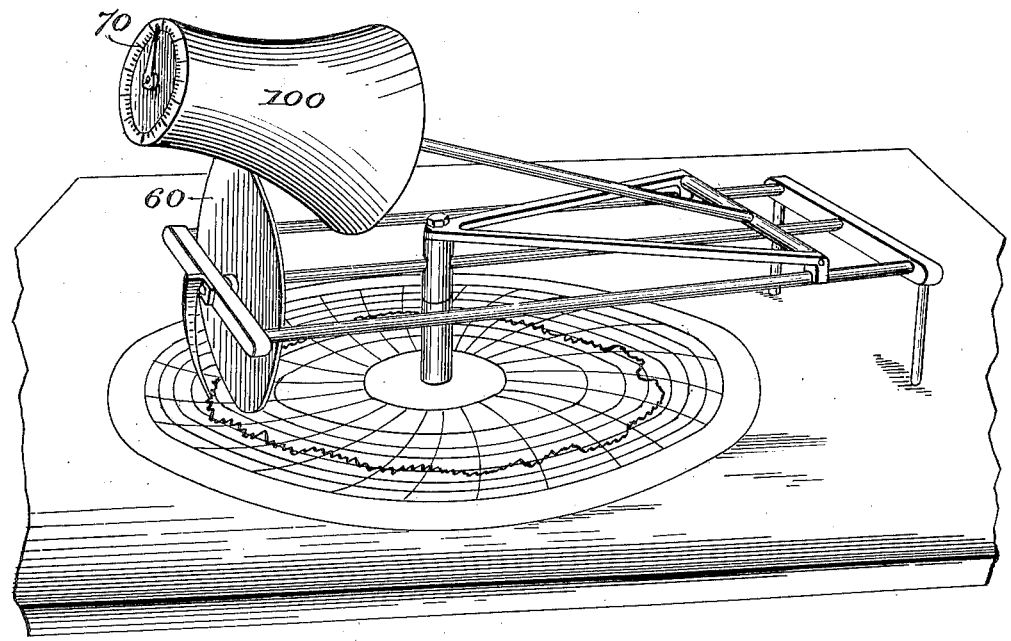

Figure 1 is a perspective view of an instrument embodying the invention in which the variable diameter element of the integrater is movable with the tracer; and Fig. 2 is a similar view of an instrument embodying the same principle in which, however, the variable diameter element is stationary with relation to the chart, and the other element movable with the tracer.

The instrument chosen to illustrate the invention is designed to indicate the average rate of flow of water through a triangular weir by the use of a chart which shows a pen record of the head throughout a given time, the rate of flow in this case varying substantially as the five-halves power of the head.

Referring to Fig. 1, the instrument is supported upon a table 1 which also affords a support for the chart 2, the said table being provided with a post 3 which constitutes a centering device for the chart as well as means for holding one of the elements of the indicating device stationary with relation to the chart. For this purpose, the post is shown as tubular and adapted to receive a spindle 4 which is part of the instrument. The said instrument is provided with a tracer 5 which is adapted to follow the pen record of the chart when the chart and the instrument are moved one with relation to the other, and with a wheel 6 rotated by peripheral contact with the chart. The said wheel 6 constitutes the prime mover of that element of the integrating device which is movable relative to the other element, the said integrating device, as a whole, being interposed between said wheel and a scale 7 and pointer 8.

In Fig. 1, the wheel 6 is shown as supported in a frame provided at the opposite end with legs 9, the said wheel 6 resting on the surface of the chart 2, while the legs 9 rest on the table beyond the periphery of the chart. The frame is longitudinally movable with relation to the spindle 4, so that as the chart is rotated on the table, or the instrument rotated with relation to the chart, the entire frame can be moved back and forth so that the tracer will follow the record. The main operative element of the integrating device is shown as a drum 10 having a variable diameter along its axis, and in Fig. 1 the said drum is shown as the longitudinally movable element, being stationary with relation to the wheel 6 and the frame, but movable with relation to the chart 2 and pointer 8. The wheel 6 and drum 10 are shown fast on the shaft 12 which has bearings at opposite ends of the frame, and which passes through an opening 13 in the spindle 4, so that the frame is positioned by said spindle, but free to be moved with the tracer 5 in following the chart record. In this construction, the drum 10 rotates with the wheel 6, and is moved longitudinally therewith as the tracer 5 follows the chart record. In this case the scale 7, which, with the pointer 8, is substantially stationary with relation to the axis of the chart, consists of graduations on the face of a wheel which is in peripheral contact with the drum 10. In the construction shown, the pointer 8 is secured to an enlarged portion 14 on a rod 15 which also constitutes an axle for the scale wheel, the enlarged portion forming a shoulder to position the wheel on the smaller portion of the axle. The said rod or axle 15 extends through a vertical slotted guide 16 connected with the frame and serving to position the wheel without preventing the vertical movement thereof which enables it to follow the periphery of the drum 10. The axle or rod 15 is shown as connected by means of a nut 17 with a yoke 18 pivoted on the ends of a cross rod 19 which is supported on the spindle 4 to accommodate the vertical movement of the scale wheel.

In the operation of the device, when the chart 2 is turned upon the post 3 as a center while the tracer 5 is being moved toward and from the post to follow the pen record, the wheel 6 will be rotated causing a corresponding rotation of the drum 10 which, in turn, rotates the scale 7 with relation to the pointer 8. It is obvious that the rate of rotation of the scale wheel 7 will vary in response to its position relative to the drum 10, while the position of the said drum 10 depends upon the position of the tracer on the chart. If, therefore, the drum 10 is so designed that its diameter at any position with relation to the chart is such as to produce a rotary movement of the scale 7 which varies as the five-halves power of the distance between the tracer 5 and the path on the chart which indicates zero, the average indicated by the scale and pointer will be directly proportional to the average rate of flow which is desired. If a strip or rectangular chart is to be averaged, it is obvious that the movement of the chart to correspond to its original time element movement must be rectilinear, so that the rate of rotation of the tracing wheel will not vary as its position varies on the chart. With this instrument, however, the average either directly or indirectly proportional to the chart record can be secured by properly designing the integrating device, the operation of which responds to the movement of the tracer over the record line which has been drawn on the chart. It is necessary in all cases that the tracing wheel should rotate throughout the entire movement which represents the time element, and since it is impracticable to reduce the resultant of this movement to zero, the integrating device is so arranged that a certain indication is shown when the tracing pointer is on zero line of the chart. The drum 10 is designed, however, so that the zero indication may be regarded as a constant to be deducted from all readings.

It is obvious that the structural features of the invention are susceptible of wide modification without departing from the invention, and I have shown one such modification in Fig. 2 in which the scale 70, which is the equivalent of the scale 7, Fig. 1, is on the drum 100, which is the equivalent of the drum 10, Fig. 1. In this construction, the drum 100 is stationary with relation to the chart, and is rotated by direct peripheral contact with the wheel 60. The remaining features of construction and arrangement are clearly shown in the drawing, and appear to need no further description, since this structure is shown merely as an example of the many ways in which the invention can be carried out.

The invention is not limited to any particular construction or arrangement of operating parts, but embraces any instrument of this kind having an integrating device interposed between the tracer and the indicator, which depends for its operation upon a movement indirectly produced by a chart movement corresponding to the element of time, combined with a movement corresponding to the increments of the chart record.

What I claim is:

1. An integrating instrument for chart records comprising a tracer for the chart record, and a wheel adapted to be rotated by a relative movement of the chart and tracer; an indicator; and an integrating device interposed between said wheel and said indicator, said integrating device consisting of a wheel and drum in peripheral contact with each other and longitudinally movable one with relation to the other, the longitudinal element of the surface of said drum being a curved line.

2. An integrating device consisting of a relatively movable scale and pointer, one of which is operated by a rotary element; a second rotary element in peripheral contact with the rotary element first named, one of said elements being of such shape that the intersection of its working surface with a plane through its axis will be a curved line; and means for moving one of said elements with relation to the other in conformity with the element of variable diameter and in the general direction of the axes of both.

3. An instrument comprising a tracer adapted to follow the record of a chart; a drum having varying diameters; a rotating element; an indicator operated by peripheral contact between the said drum and said rotating element; means for varying the relative positions of said drum and said rotating element in response to the movement of the tracer in following the pen record of the chart; and means for causing the rotation of said rotating element in response to a relative movement of the chart and tracer which corresponds to the time element of the chart.

4. An averaging instrument having a tracing pointer and a wheel adapted to be rotated by its peripheral engagement with the chart; a drum rotatably connected with said wheel and being movable therewith in a direction parallel to its own axis, said drum having a varying diameter, and a scale and pointer longitudinally stationary with relation to said drum, one of said parts consisting of a wheel or disk operated by peripheral engagement with said drum.

In testimony whereof, I have signed my name to this specification in the presence of two subscribing witnesses.

ERVIN G. BAILEY.

Witnesses:
   JAS. J. MALONEY,
   W. E. COVENEY.